US008223293B2

(12) United States Patent  (10) Patent No.: US 8,223,293 B2
Chiu et al.  (45) Date of Patent: Jul. 17, 2012

(54) LIQUID CRYSTAL DISPLAY AND METHOD OF ASSEMBLING LIQUID CRYSTAL DISPLAY

(75) Inventors: Yen-Kai Chiu, Taipei (TW); Yung-Chih Kuo, Taipei (TW)

(73) Assignee: Compal Electronics, Inc., Taipei (TW)

( * ) Notice: Subject to any disclaimer, the term of this patent is extended or adjusted under 35 U.S.C. 154(b) by 209 days.

(21) Appl. No.: 12/646,977

(22) Filed: Dec. 24, 2009

(65) Prior Publication Data

US 2010/0265427 A1 Oct. 21, 2010

Related U.S. Application Data

(60) Provisional application No. 61/170,110, filed on Apr. 17, 2009.

(51) Int. Cl.
*G02F 1/1333* (2006.01)
(52) U.S. Cl. .................. 349/58; 361/679.29; 361/679.27
(58) Field of Classification Search .......................... None
See application file for complete search history.

(56) References Cited

U.S. PATENT DOCUMENTS

| 5,751,544 | A  | * | 5/1998  | Song ........................ 361/679.09 |
| 7,239,504 | B2 | * | 7/2007  | Schlesener et al. ...... 361/679.09 |
| 2002/0039154 | A1 | * | 4/2002 | Miwa .............................. 349/58 |
| 2003/0142472 | A1 | * | 7/2003 | Park .............................. 361/683 |
| 2005/0168930 | A1 | * | 8/2005 | Kim et al. ..................... 361/683 |
| 2009/0256989 | A1 | * | 10/2009 | Lee et al. ........................ 349/58 |

* cited by examiner

*Primary Examiner* — Thanh-Nhan P. Nguyen
(74) *Attorney, Agent, or Firm* — Jianq Chyun IP Office

(57) ABSTRACT

A method of assembling a liquid crystal display is provided. First, a front cover, a bezel, a liquid crystal panel and a hinge are provided, wherein the front cover has an opening, and the bezel has a first hinge cap. The hinge is assembled to the liquid crystal panel. The front cover and the liquid crystal panel are assembled to the bezel, such that the hinge is partially covered by the first hinge cap, and the liquid crystal panel is exposed by the opening. A second hinge cap is provided. The second hinge cap is assembled to the first hinge cap, such that the hinge is wrapped by the first hinge cap and the second hinge cap. A back cover is provided. The back cover is assembled to the front cover.

5 Claims, 5 Drawing Sheets

LIQUID CRYSTAL DISPLAY AND METHOD OF ASSEMBLING LIQUID CRYSTAL DISPLAY

CROSS-REFERENCE TO RELATED APPLICATION

This application claims the priority benefit of U.S. provisional application Ser. No. 61/170,110, filed on Apr. 17, 2009. The entirety of the above-mentioned patent application is hereby incorporated by reference herein and made a part of specification.

BACKGROUND OF THE INVENTION

1. Field of the Invention

The present invention generally relates to an electronic device and a method of assembling an electronic device. More particularly, the present invention relates to a liquid crystal display and a method of assembling a liquid crystal display.

2. Description of Related Art

With optoelectronic and semiconductor technologies advance, technologies for fabricating a planar display are matured. Among the planar displays, a liquid crystal display with advantages of high image quality, high compactness, low power consumption and free radiation has become a main stream of the market.

Generally, a liquid crystal display includes a front cover, a back cover, a bezel and a liquid crystal panel, wherein the bezel and the liquid crystal panel are assembled to each other and fixed between the front cover and the back cover. A hinge disposed at the liquid crystal panel is suitable for being pivoted to a main frame of a notebook computer, and the hinge is wrapped by a first hinge cap and a second hinge cap. For example, the first hinge cap is fixed on the bezel, the second hinge cap is fixed on the back cover by a thermal plastic glue, and the first hinge cap combines with the second hinge cap so that the hinge is wrapped by the first and the second hinge caps. In this way, however, the back cover is difficult to be taken apart from the bezel since the second hinge cap fixed on the back cover is assembled to the first hinge cap fixed on the bezel. Therefore, it is not convenient to dismantle the liquid crystal display while the liquid crystal display is need of repair.

SUMMARY OF THE INVENTION

The present invention is to provide a method of assembling a liquid crystal display convenient to be dismantled.

The present invention is to provide a liquid crystal display convenient to be dismantled.

As embodied and broadly described herein, the present invention provides a method of assembling a liquid crystal display is provided. First, a front cover, a bezel, a liquid crystal panel and a hinge are provided, wherein the front cover has an opening, and the bezel has a first hinge cap. The hinge is assembled to the liquid crystal panel. The front cover and the liquid crystal panel are assembled to the bezel, such that the hinge is partially covered by the first hinge cap, and the liquid crystal panel is exposed by the opening. Next, a second hinge cap is provided. The second hinge cap is assembled to the first hinge cap, such that the hinge is wrapped by the first hinge cap and the second hinge cap. Then, a back cover is provided. The back cover is assembled to the front cover.

According to an embodiment of the present invention, a method for assembling the hinge to the liquid crystal panel is provided. First, a metal plate is provided. Then, the metal plate is fixed to the hinge. The hinge is assembled to the liquid crystal panel by fixing the metal plate to the liquid crystal panel.

According to an embodiment of the present invention, the back cover is assembled to the bezel and the liquid crystal panel while the back cover is assembled to the front cover.

According to an embodiment of the present invention, a method for assembling the back cover to the bezel and the liquid crystal panel while assembling the back cover to the front cover is screwing the front cover, the bezel, the liquid crystal panel and the back cover together.

As embodied and broadly described herein, the present invention provides a liquid crystal display including a front cover, a bezel, a liquid crystal panel, a hinge, a back cover and a second hinge cap. The front cover has an opening. The bezel is disposed under the front cover, wherein the bezel has a first hinge cap. The liquid crystal panel is disposed under the bezel and exposed by the opening. The hinge is assembled to the liquid crystal panel. The back cover is disposed under the liquid crystal panel and assembled to the front cover. The second hinge cap is assembled to the back cover and the first hinge cap, wherein the hinge is wrapped by the first hinge cap and the second hinge cap.

According to an embodiment of the present invention, the first hinge cap is detachable from the bezel.

According to an embodiment of the present invention, the second hinge cap is detachable form the back cover.

In summary, since the method of assembling a liquid crystal display of the present invention can combine the first hinge cap with the second hinge cap for wrapping the hinge, no hinge cap is needed to be disposed on the back cover. In this way, the back cover is easier to be taken apart from the bezel while the liquid crystal display is need of repair.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1A:
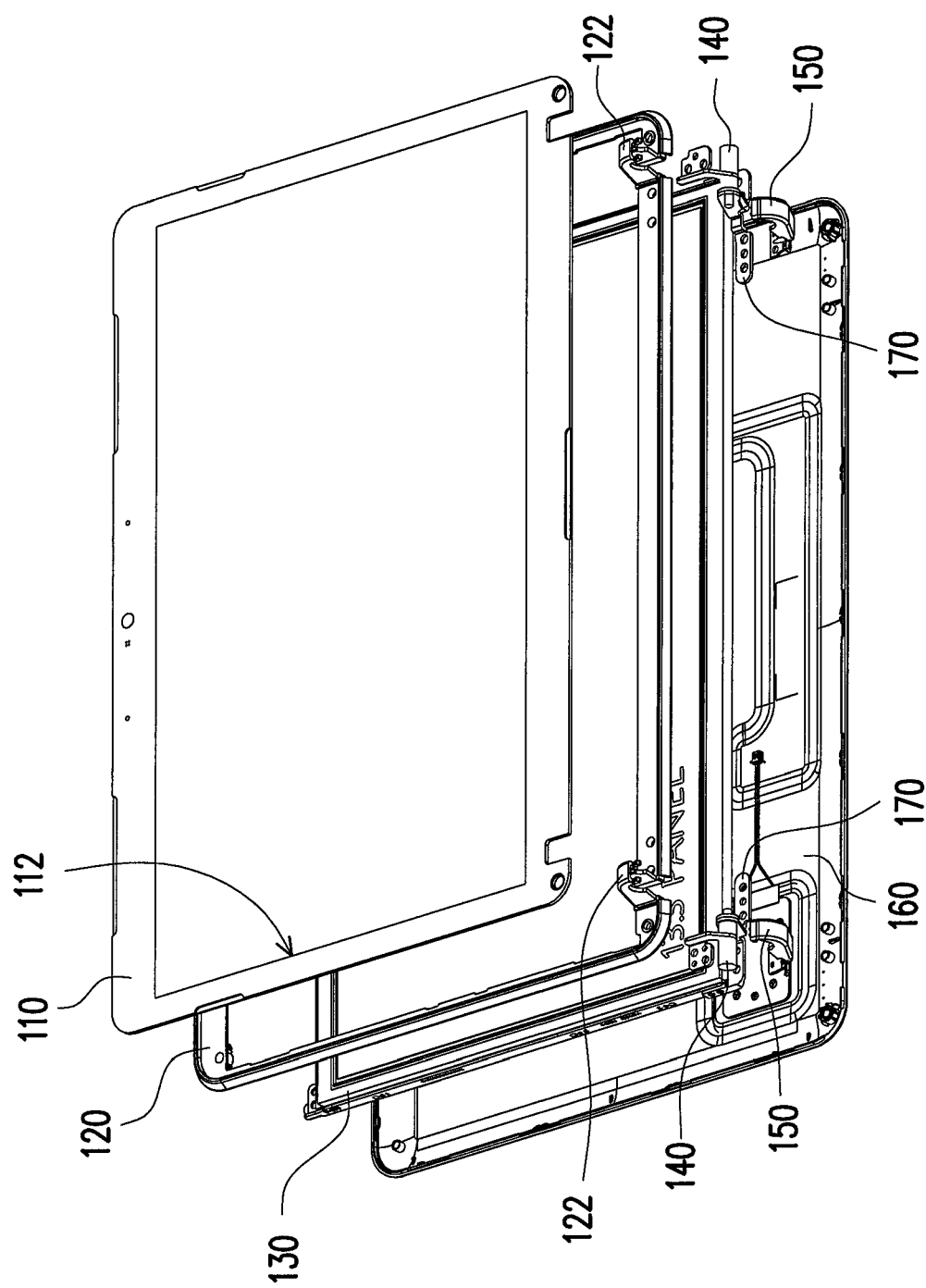
FIG. 1A to FIG. 1D are profile views schematically illustrating the assembling process for a liquid crystal display according to an embodiment of the present invention.

Reference will now be made in detail to the present embodiments of the invention, examples of which are illustrated in the accompanying drawings. Wherever possible, the same reference numbers are used in the drawings and the description to refer to the same or like parts.

Figure 1B:
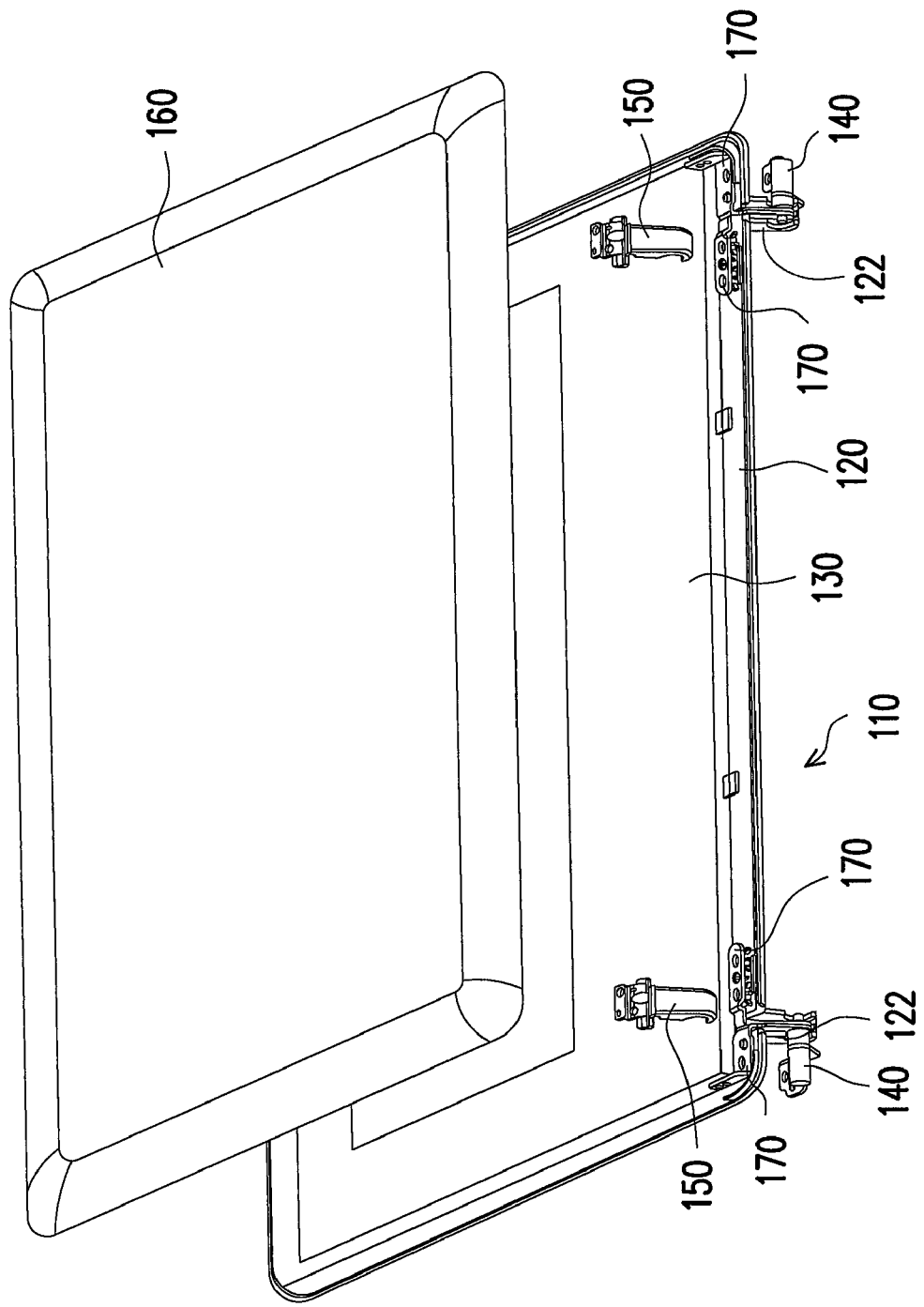
Figure 1C:
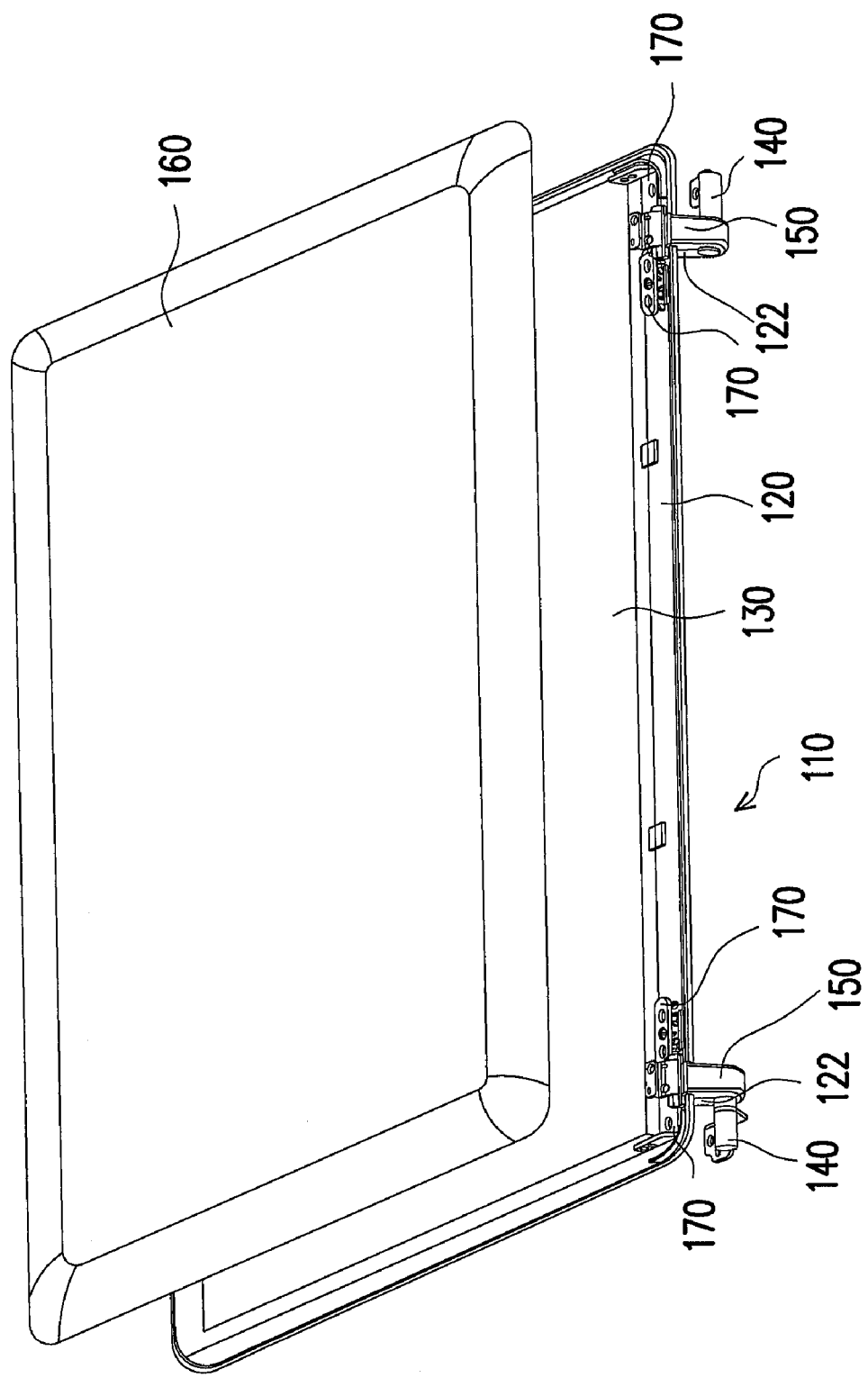
Figure 1D:
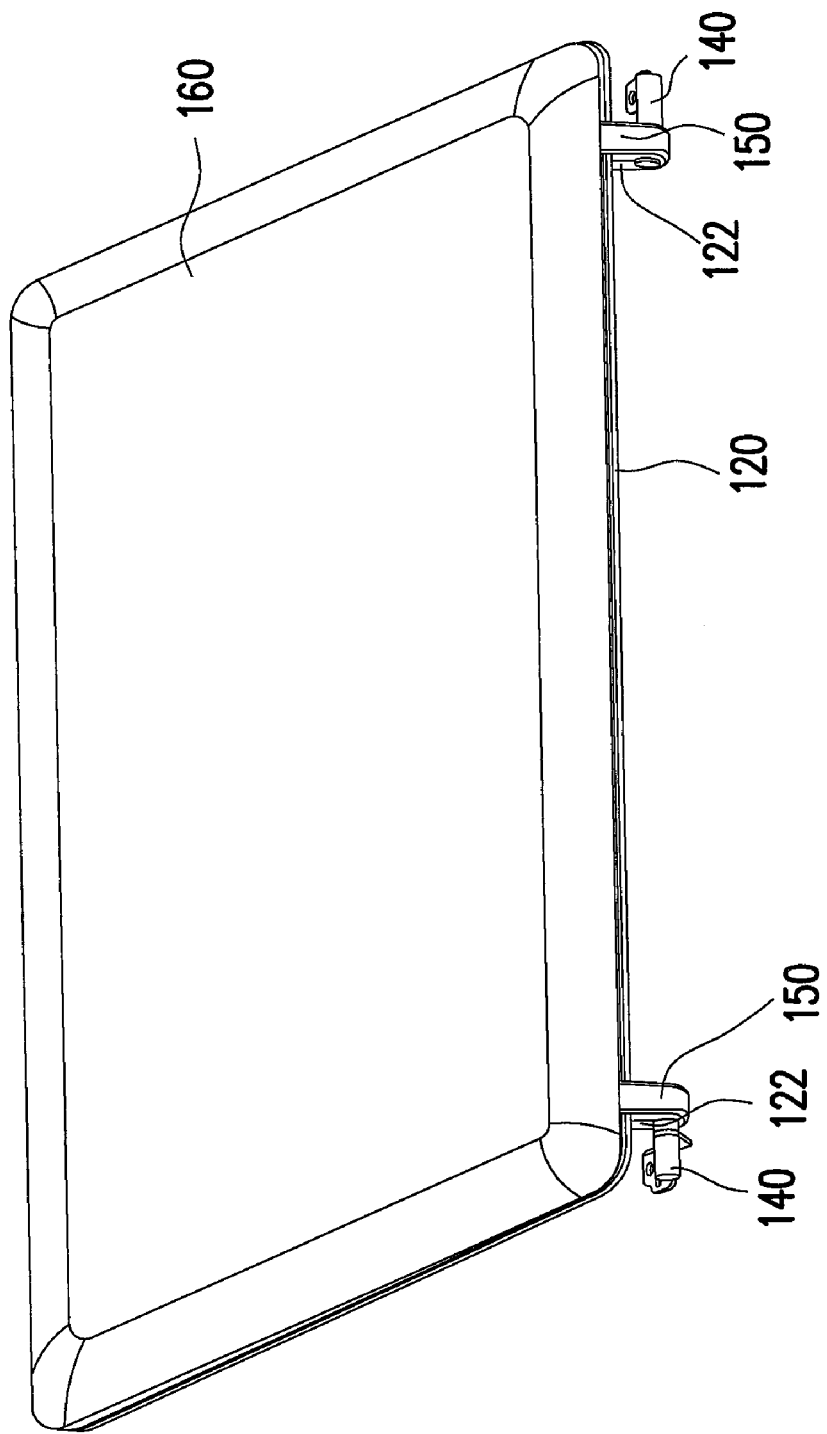
Figure 2:
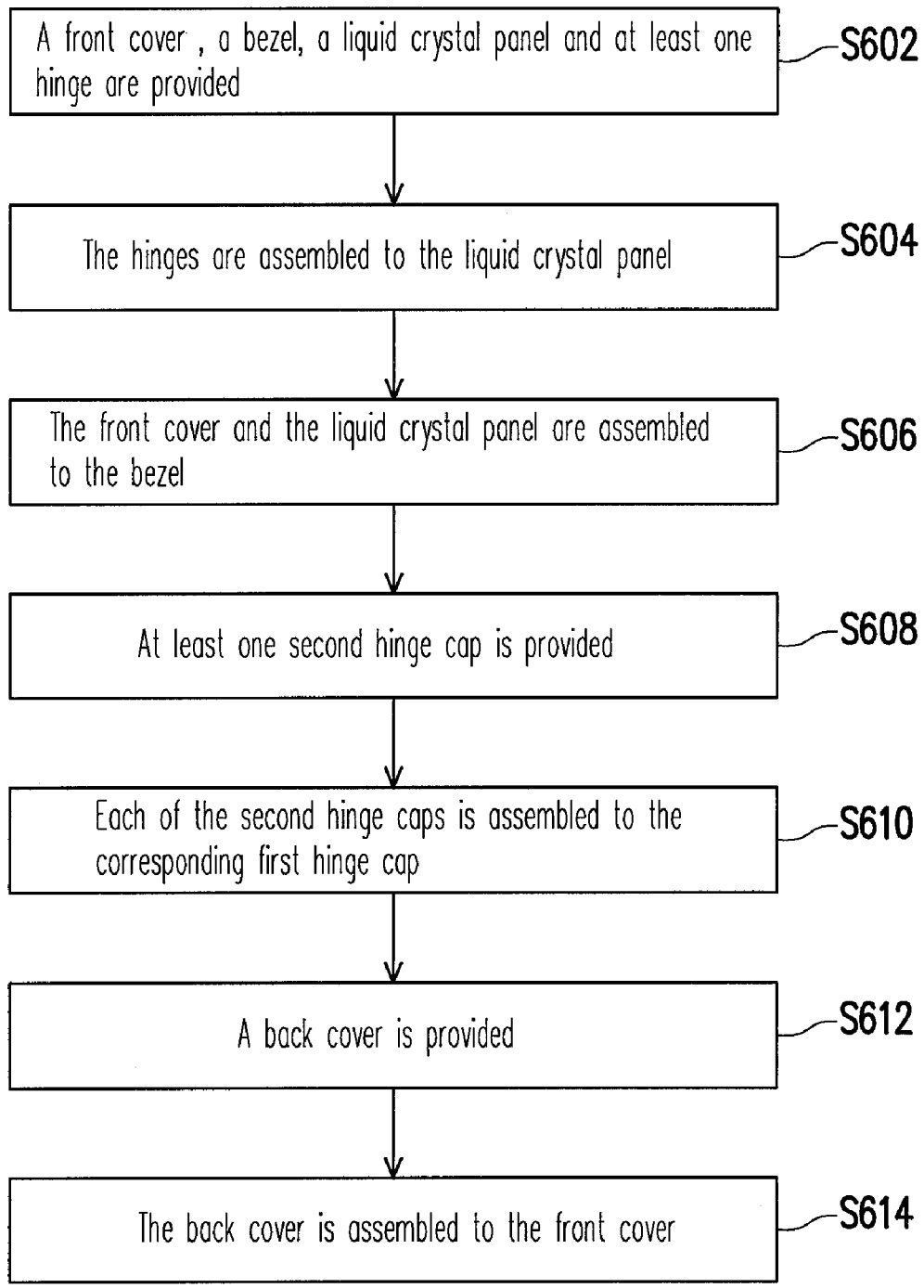
FIG. 2 is a flow chart showing the steps for assembling the liquid crystal display of FIG. 1D.

FIG. 1A to FIG. 1D are profile views schematically illustrating the assembling process for a liquid crystal display according to an embodiment of the present invention. FIG. 2 is a flow chart showing the steps for assembling the liquid crystal display of FIG. 1. The angle of view in FIG. 1B to FIG. 1D is opposite to the angle of view in FIG. 1A for clearer description. Referring to FIG. 1A and FIG. 2, first, a front cover 110, a bezel 120, a liquid crystal panel 130 and at least one (showing two) hinge 140 are provided (step S602 shown in FIG. 2), wherein the front cover 110 has an opening 112, and the bezel 120 has at least one (showing two) first hinge cap 122.

Referring to FIG. 1B and FIG. 2, the hinges 140 are assembled to the liquid crystal panel 130 (step S604 shown in FIG. 2), the front cover 110 and the liquid crystal panel 130 are assembled to the bezel 120 (step S606 shown in FIG. 2), such that each of the hinges 140 is partially covered by the corresponding first hinge cap 122, and the liquid crystal panel 130 is exposed by the opening 112. It should be noted that, in the angle of view of FIG. 1B, the front cover 110 and the opening 112 thereof are under the liquid crystal panel 130 and are not visible.

Referring to FIG. 1C and FIG. 2, at least one (showing two) second hinge cap 150 (also shown in FIG. 1A and FIG. 1B) is provided (step S608 shown in FIG. 2), and each of the second hinge caps 150 is assembled to the corresponding first hinge cap 122 (step S610 shown in FIG. 2), such that each of the hinges 140 is wrapped by the corresponding first hinge cap 122 and the corresponding second hinge cap 150. It should be noted that, in the angle of view of FIG. 1C, the front cover 110 and the opening 112 thereof are under the liquid crystal panel 130 and are not visible.

Referring to FIG. 1D and FIG. 2, a back cover 160 (also shown in FIG. 1A to FIG. 1C) is provided (step S612 shown in FIG. 2), and the back cover 160 is assembled to the front cover 110 (step S614 shown in FIG. 2) to protect the liquid crystal panel 130 therebetween from damage, such that the assembling of the liquid crystal display 100 is complete.

Referring to FIG. 1A and FIG. 1D, the liquid crystal display 100 includes a front cover 110, a bezel 120, a liquid crystal panel 130, at least one (showing two) hinge 140, a back cover 160 and a second hinge cap 150. The front cover 110 has an opening 112. The bezel 120 is disposed under the front cover 110, wherein the bezel 120 has a first hinge cap 122. The liquid crystal panel 130 is disposed under the bezel 120 and exposed by the opening 112. The hinge 140 is assembled to the liquid crystal panel 130. The back cover 160 is disposed under the liquid crystal panel 130 and assembled to the front cover 110. The second hinge cap 150 is assembled to the back cover 160 and the first hinge cap 122, wherein the hinge 140 is wrapped by the first hinge cap 122 and the second hinge cap 150. Accordingly, the liquid crystal display 100 can be pivoted to a main frame of a notebook computer (not shown) through the hinges 140. It should be noted that, in the angle of view of FIG. 1D, the liquid crystal panel 130, the front cover 110 and the opening 112 thereof are under the back cover 160 and are not visible.

Referring to FIG. 1C, in the present embodiment, since the first hinge caps 122 are not formed on the bezel 120, and the second hinge caps 150 assembled to the first hinge caps 122 are not formed on the back cover 160 either, the first hinge caps 122 are detachable from the bezel 120 and the second hinge caps are detachable form the back cover 160. Therefore, the back cover 160 is easier (or without damage) to be taken apart from the bezel 130 while the liquid crystal display 100 shown in FIG. 1D is need of repair.

Particularly, referring to FIG. 1A, for assembling the hinge 140 to the liquid crystal panel 130, metal plates 170 are provided and fixed to the hinges 140, and each of the metal plates 170 is fixed to the liquid crystal panel 130 (as shown in FIG. 1B). In addition, the back cover 160 is assembled to the bezel 120 and the liquid crystal panel 130 while the back cover 160 is assembled to the front cover 110 (as shown in FIG. 1D). The method for assembling the back cover 160 to the bezel 120 and the liquid crystal panel 130 while assembling the back cover 160 to the front cover 110 is, for example, screwing the front cover 110, the bezel 120, the liquid crystal panel 130 and the back cover 160 together.

More particularly, in the present embodiment, the front cover 110 is wedged to the bezel 120 first, the liquid crystal panel 130 is fixed to the bezel 120 after the front cover 110 is wedged to the bezel 120, the bezel 120 is wedged to the back cover 160 after the liquid crystal panel 130 is fixed to the bezel 120, and finally the front cover 110, the bezel 120, the liquid crystal panel 130 and the back cover 160 are screwed together. However, in alternative embodiments not illustrated, the bezel 120 can be wedged to the back cover 160 before the front cover 110 is wedged to the bezel 120, and the liquid crystal panel 130 can be fixed to the bezel 120 before the front cover 110 is wedged to the bezel 120. The present invention should not be limited to any particular embodiment described herein.

In summary, since the method of assembling a liquid crystal display of the present invention can combine the first hinge cap with the second hinge cap for wrapping the hinge, no hinge cap is needed to be disposed on the back cover. In this way, the back cover is easier to be taken apart from the bezel, so that it is more convenient to dismantle the liquid crystal display while the liquid crystal display is need of repair.

It will be apparent to those skilled in the art that various modifications and variations may be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method of assembling a liquid crystal display, comprising:
   providing a front cover, a bezel, a liquid crystal panel and a hinge, wherein the front cover has an opening, and a first hinge cap is detachably disposed on the bezel;
   assembling the hinge to the liquid crystal panel;
   assembling the front cover and the liquid crystal panel to the bezel, such that the hinge is partially covered by the first hinge cap, and the liquid crystal panel is exposed by the opening;
   providing a second hinge cap;
   assembling the second hinge cap to the first hinge cap, such that the hinge is wrapped by the first hinge cap and the second hinge cap;
   providing a back cover, detachable from the second hinge cap; and
   assembling the back cover to the front cover.

2. The method of assembling a liquid crystal display as claimed in claim 1, wherein a method for assembling the hinge to the liquid crystal panel comprising:
   providing a metal plate;
   fixing the metal plate to the hinge;
   assembling the hinge to the liquid crystal panel by fixing the metal plate to the liquid crystal panel.

3. The method of assembling a liquid crystal display as claimed in claim 1, further comprising:
   assembling the back cover to the bezel and the liquid crystal panel while assembling the back cover to the front cover.

4. The method of assembling a liquid crystal display as claimed in claim 3, wherein a method for assembling the back cover to the bezel and the liquid crystal panel while assembling the back cover to the front cover is screwing the front cover, the bezel, the liquid crystal panel and the back cover together.

5. A liquid crystal display, comprising:
a front cover, having an opening;
a bezel, disposed under the front cover, wherein the bezel has a first hinge cap is detachably disposed on the bezel;
a liquid crystal panel, disposed under the bezel and exposed by the opening;
a hinge, assembled to the liquid crystal panel;
a back cover, disposed under the liquid crystal panel and assembled to the front cover; and
a second hinge cap, assembled to the back cover and the first hinge cap, wherein the second hinge cap is detachable from the back cover and the hinge is wrapped by the first hinge cap and the second hinge cap.

* * * * *